US009773287B1

(12) United States Patent
Goo et al.

(10) Patent No.: US 9,773,287 B1
(45) Date of Patent: Sep. 26, 2017

(54) WEAPON MANAGEMENT SYSTEM USING POLICE OFFICER BLACK-BOX, METHOD AND APPARATUS FOR POLICE OFFICER BLACK-BOX

(71) Applicant: Base Korea Information Communication Co., Ltd., Seoul (KR)

(72) Inventors: Ja Min Goo, Seoul (KR); Ja Cheon Koo, Seoul (KR); Sun Chan Kweon, Busan (KR); Joong Wuk Kang, Cheonan-si (KR)

(73) Assignee: Base Korea Information Communication Co., Ltd., Seoul (KR)

( * ) Notice: Subject to any disclaimer, the term of this patent is extended or adjusted under 35 U.S.C. 154(b) by 0 days.

(21) Appl. No.: 15/213,510

(22) Filed: Jul. 19, 2016

(30) Foreign Application Priority Data

Jun. 17, 2016 (KR) ........................ 10-2016-0075480

(51) Int. Cl.
*G06F 19/00* (2011.01)
*G06Q 50/26* (2012.01)
*F41A 35/00* (2006.01)

(52) U.S. Cl.
CPC .............. *G06Q 50/26* (2013.01); *F41A 35/00* (2013.01)

(58) Field of Classification Search
USPC .................................................. 235/411, 404
See application file for complete search history.

(56) References Cited

U.S. PATENT DOCUMENTS 6,823,621 B2 11/2004 Gotfried
7,855,935 B1 * 12/2010 Lauder ...................... G01S 3/80 367/127
8,320,217 B1 * 11/2012 Barger .................... F41G 3/147 367/127
8,351,297 B2 1/2013 Lauder et al.
2006/0082730 A1 4/2006 Franks
2014/0327541 A1 * 11/2014 Ani ......................... G01S 19/16 340/539.13
2014/0349254 A1 * 11/2014 Lohbihler ............. F41G 3/2655 434/22
2016/0086472 A1 * 3/2016 Herrera .................. G08B 21/18 340/539.11
2016/0182850 A1 * 6/2016 Thompson ........... H04N 9/8205 348/158

FOREIGN PATENT DOCUMENTS

KR 10-2011-0060432 A 6/2011

* cited by examiner

*Primary Examiner* — Ahshik Kim
(74) *Attorney, Agent, or Firm* — Sughrue Mion, PLLC

(57) ABSTRACT

Disclosed herein are a weapon management system using a cop's black-box which collects environment information by sensing an aiming movement of a user to a subject according to use of a weapon from a first cop's black-box, and receives, from a plurality of second cop's black-boxes located within a preset radial distance from the user, external environment information based on the aiming movement of the user, a cop's black-box, and a method for the same. Use of the weapon may be monitored in real time using collected environment information and external environment information such that a further action can be taken.

20 Claims, 6 Drawing Sheets

WEAPON MANAGEMENT SYSTEM USING POLICE OFFICER BLACK-BOX, METHOD AND APPARATUS FOR POLICE OFFICER BLACK-BOX

CROSS-REFERENCE TO RELATED APPLICATION

This application claims the priority benefit of Korean Patent Application No. 10-2016-0075480, filed on Jun. 17, 2016 in the Korean Intellectual Property Office, the disclosure of which is incorporated herein by reference.

BACKGROUND OF THE INVENTION

1. Field of the Invention

The present invention relates to a weapon management system using a cop's black-box, and a method and apparatus for the cop's black-box, and more particularly, to a weapon management system using a cop's black-box which collects environment information by sensing an aiming movement of a user to a subject according to use of a weapon from a first cop's black-box, and receives, from a plurality of second cop's black-boxes located within a preset radial distance from the user, external environment information based on the aiming movement of the user, a cop's black-box, and a method therefor.

2. Description of the Related Art

Conventionally, only limited possession and use of weapons have been allowed in this country and thus accidents related to weapons have been rare. However, as possession and use of limited weapons such as hunting rifles and air guns for various purposes including hunting, scaring birds away, and sports activities were allowed. In particular, as accidents related to weapons have recently occurred home and abroad, there is a need for a systematic method for tracking and controlling use of weapons.

In particular, attention has been drawn to legal use of weapons among police officers, and demands for management or monitoring of use of weapons have drastically increased. Thereby, effort have been put into collecting environment information according to use of weapons to determine legality of use of weapons.

In this regard, in conventional weapon-related technology, environment information about surroundings according to firing is collected using a camera operated by firing of a weapon of a police officer, or location information about police officers is collected. Then, the collected information is transmitted to, for example, the police station. According to such conventional technology, environment information provided after use (firing) of the weapon of a police officer is collected to determine legality of use of the weapon. According, the conventional technology has a limit in performing real-time monitoring by determining the overall situation in relation to use of the weapon.

Further, according to the conventional technology, as the environment information according to firing of a weapon is collected using a camera included in a police car, only information about the environment near the police car can be collected.

RELATED DOCUMENTS

Patent Documents

U.S. Pat. No. 6,823,621 (Invention Title: INTELLIGENT WEAPON)

US Patent Application Publication No. 2006-0082730 (Invention Title: FIREARM AUDIOVISUAL RECORDING SYSTEM AND METHOD)

U.S. Pat. No. 8,351,297 (Invention Title: SYSTEM AND METHODS OF AUTOMATED CORRELATION OF WEAPON FIRE DATA WITH MONITORED PERSONS-OF-INTEREST/LOCATIONS DATA)

Korean patent application publication No. 10-2011-0060432 (Invention Title: Method and Apparatus for Secure Gun Control by Using Biometrics)

SUMMARY OF THE INVENTION

Therefore, the present invention has been made in view of the above problems, and it is an object of the present invention to provide a cop's black-box capable of sensing preparation of firing based on contact of a user with a weapon and collecting environment information according to an aiming movement the user to a subject.

Another object of the present invention is to provide a cop's black-box capable of being attached to the body of a user, a weapon, a police car and a motorcycle to collect most accurate and approximate environment information according to use of the weapon by the user.

Another object of the present invention is to provide a cop's black-box which may be utilized in at least one of the fields including neighborhood patrol, the police, military patrol and military operation.

Another object of the present invention is to provide a weapon management system using a cop's black-box capable of collecting information about an external environment within a boundary of a user from cop's black-boxes of a plurality of fellow users located within a preset radial distance from the user, based on an aiming movement of the user standing against a subject.

Another object of the present invention is to provide a weapon management system using a cop's black-box capable of performing real-time monitoring of use of weapons using collected environment information and external environment information and taking a further action.

In accordance with an aspect of the present invention, the above and other objects can be accomplished by the provision of a weapon management system using a cop's black-box, the weapon management system including a first cop's black-box configured to sense an aiming movement of a user to a subject based on sensing information received from a plurality of sensor modules included in a weapon and to collect, based on the sensed aiming movement, environment information from an environment information collecting module associated with the user, and a weapon management server configured to receive external environment information from a plurality of second cop's black-boxes located within a preset boundary around the user, based on an event message received from the first cop's black-box according to the aiming movement to the subject.

The first cop's black-box may include a movement sensing unit configured to sense the aiming movement of the user to the subject based on the sensing information received from the sensor modules included in the weapon, an operation controller configured to perform a control operation to collect, from the environment information collecting module, the environment information within a radial distance from the user based on the sensed aiming movement, the environment information collecting module including at least one of a camera, a microphone and a global positioning system (GPS) device, and a communication unit configured to receive the sensing information about a contact from the plurality of sensor modules and to transmit the environment information collected from the environment information collecting module.

The movement sensing unit may sense the aiming movement of the user to the subject based on the sensing information received from the plurality of sensor modules, the plurality of sensor modules including at least one of a gyro sensor, an acceleration sensor, a gravity sensor, a geomagnetic sensor and a touch sensor.

The movement sensing unit may sense contact of the user with the weapon, the aiming movement to the subject, and a phased movement of firing based on the sensing information received from the plurality of sensor modules.

The operation controller may sense preparation of firing based on the contact of the user with the weapon, and controls triggering and stopping of an operation to collect the environment information in the environment information collecting module associated with the user or the weapon according to the aiming movement to the subject.

The weapon management server may include a communication controller configured to generate and transmit a control command to collect, from the event message received from the first cop's black-box based on the aiming movement of the user to the subject, the external environment information of the plurality of second cop's black-boxes located within the preset boundary around the user, and a media manager configured to collect and manage the external environment information corresponding to the control command transmitted to the second cop's black-boxes.

The communication controller may receive the external environment information about the boundary of the user from an environment information collecting module associated with the plurality of second cop's black-boxes according to the control command generated and transmitted to the plurality of second cop's black-boxes, wherein the external environment information may include information about the boundary of the user which is not collected by the first cop's black-box.

The media manager may collect, manage and store the external environment information received from the plurality of second cop's black-boxes and the event message and environment information received from the first cop's black-box.

The communication controller may perform a control operation to transmit, to an external data processing server, situation information about use of the weapon based on at least one of the external environment information, event message and environment information managed by and stored in the media manager.

The event message may include at least one of an ID corresponding to the weapon possessed by the user, a recorder flag (recorder start/stop flag) of the first cop's black-box, GPS information (a GPS value) and daily information (a date).

In accordance with another aspect of the present invention, there is provided a cop's black-box including a movement sensing unit configured to sense an aiming movement of a user to a subject based on sensing information received from a plurality of sensor modules included in a weapon, an operation controller configured to perform a control operation to collect, from an environment information collecting module, environment information within a radial distance from the user based on the sensed aiming movement, the environment information collecting module including at least one of a camera, a microphone and a global positioning system (GPS) device, and a communication unit configured to receive the sensing information about a contact from the plurality of sensor modules and to transmit the environment information collected from the environment information collecting module.

The operation controller may perform a control operation to collect the environment information by controlling triggering and stopping of operation of the environment information collecting module according to the aiming movement of the user to the subject or a control command received from a weapon management server.

The operation controller may perform a control operation to transmit situation information about use of the weapon to the weapon management server through the communication unit, the situation information being based on at least one of an event message generated based on the aiming movement and containing at least one of an ID corresponding to the weapon possessed by the user, a recorder flag (recorder start/stop flag), GPS information (a GPS value) and daily information (a date) and the environment information.

In accordance with another aspect of the present invention, there is provided a method for operating a cop's black-box, including sensing an aiming movement of a user to a subject based on sensing information received from a plurality of sensor modules included in a weapon, collecting, from an environment information collecting module, environment information within a radial distance from the user based on the sensed aiming movement, the environment information collecting module including at least one of a camera, a microphone and a global positioning system (GPS) device, and transmitting the environment information collected from the environment information collecting module.

The sensing of the aiming movement may include sensing contact of the user with the weapon, the aiming movement to the subject, and a phased movement of firing based on the sensing information received from the plurality of sensor modules.

The collecting of the environment information may include collecting the environment information from the environment information collecting module according to the phased movement or a control command received from a weapon management server.

The transmitting of the environment information may include transmitting situation information about use of the weapon to the weapon management server, the situation information being based on at least one of an event message generated based on the aiming movement and containing at least one of an ID corresponding to the weapon possessed by the user, a recorder flag (recorder start/stop flag), GPS information (a GPS value) and daily information (a date) and the environment information.

According to an embodiment, a weapon management system using a cop's black-box may collect information about an external environment within a boundary of a user from cop's black-boxes of a plurality of fellow users located within a preset radial distance from the user, based on an aiming movement of the user standing against a subject.

According to an embodiment of the present invention, use of a weapon may be monitored in real time using collected environment information and external environment information such that a further action can be taken.

According to an embodiment, a cop's black-box may sense preparation of firing based on contact of a user with a weapon and collect environment information according to an aiming movement the user to a subject.

According to an embodiment of the present invention, the cop's black-box may be attached to the body of a user, a weapon, a police car and a motorcycle to collect most accurate and approximate environment information according to use of the weapon by the user.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. However, the present invention is not limited or defined by the illustrated embodiments.

Terms used in this specification are merely adopted to explain specific embodiments, and are not intended to limit the present invention. A singular expression includes a plural expression unless the two expressions are contextually different from each other. In this specification, a term "comprises" and/or "comprising" is intended to indicate that constituents, steps, operations, and/or devices disclosed in this specification does not exclude presence or addition of one or more other constituents, steps, operations, and/or devices.

As used herein, "embodiment", "example", "aspect", and "illustration" should not be construed as meaning that an aspect or design is preferred or advantageous over other aspects or designs.

As used herein, the terms "or" refers to "inclusive or" rather than to "exclusive or". That is, unless stated otherwise or contextually clear, the expression "x uses a or b" should be understood as meaning one of natural inclusive permutations.

As used in this specification and claims, the singular forms "a" and "an" are intended to include the plural forms as well, unless the context clearly indicates otherwise.

As used in this specification and claims, terms including ordinal numbers such as first, second, etc. may be used to explain various components, but the constituents are not limited thereto. These terms are used only for the purpose of distinguishing one constituent from another.

Unless defined otherwise, all terms (including scientific and technological terms) used in this specification and appended claims may be construed as having meaning commonly known to those skilled in the art. Terms defined in typical dictionaries should not be interpreted ideally or excessively.

In describing the present invention, a detailed description of well-known functions and constituents will be omitted if it is determined that such description can unnecessarily obscure the main points of the present invention. In addition, terms which will be used below are defined in consideration of the functions of the corresponding elements in the present invention. The definitions of the terms may vary depending on intention of a user, a precedent case, or the like. Therefore, the terms should be defined based on the entire specification.

Figure 1:
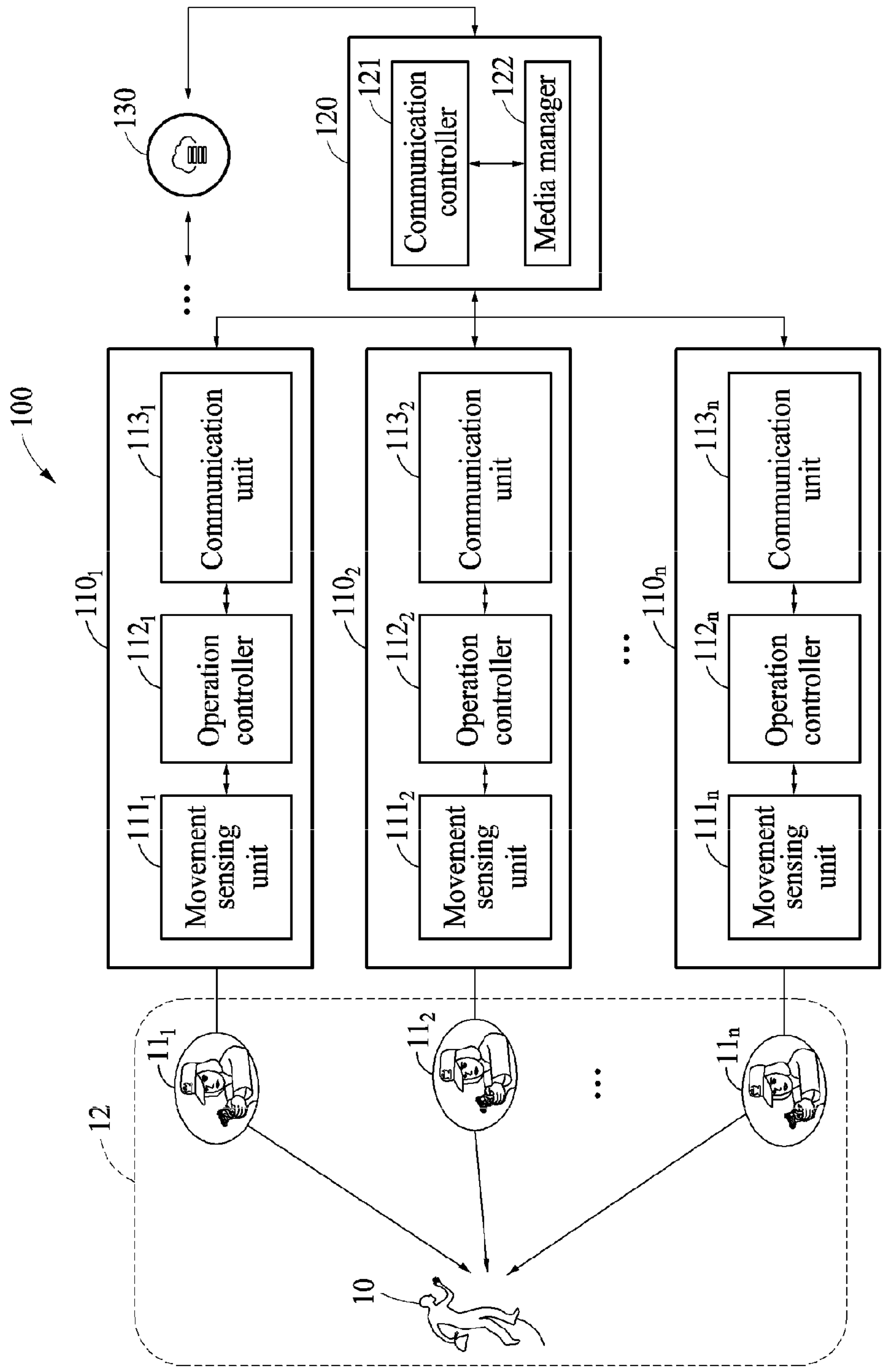
FIG. 1 is a diagram illustrating a weapon management system using a cop's black-box according to an embodiment of the present invention.

FIG. 1 is a diagram illustrating a weapon management system using a cop's black-box according to an embodiment of the present invention.

Referring to FIG. 1, a weapon management system 100 using a cop's black-box according to an embodiment of the present invention includes a weapon management server 120 to receive environment information and external environment information from the cop's black-box 110 according to an aiming movement of a user 11 to a subject 10.

To this end, the weapon management system 100 includes a first cop's black-box $\mathbf{110}_1$ and a weapon management server 120.

The first cop's black-box $\mathbf{110}_1$ senses an aiming movement of a user $\mathbf{11}_1$ to the subject 10 based on sensing information received from a plurality of sensor modules included in a weapon, and collects, based on the sensed aiming movement, environment information from an environment information collecting module associated with the user $\mathbf{11}_1$. According to an embodiment, the first cop's black-box $\mathbf{110}_1$ may be any one of the cop's black-boxes 110.

To this end, the first cop's black-box $\mathbf{110}_1$ may include a movement sensing unit $\mathbf{111}_1$, an operation controller $\mathbf{112}_1$, and a communication unit $\mathbf{113}_1$.

The movement sensing unit $\mathbf{111}_1$ may sense the aiming movement of the user $\mathbf{11}_1$ to the subject 10 based on sensing information received from a plurality of sensor modules included in a weapon.

The movement sensing unit $\mathbf{111}_1$ may sense the aiming movement of the user $\mathbf{11}_1$ to the subject 10 based on sensing information received from the plurality of sensor modules including at least one of a gyro sensor, an acceleration sensor, a gravity sensor, a geomagnetic sensor, and a touch sensor.

For example, the movement sensing unit $\mathbf{111}_1$ may sense contact of the user $\mathbf{11}_1$ with a weapon, the aiming movement of the user $\mathbf{11}_1$ to the subject 10, and a phased movement of firing based on the sensing information received from the plurality of sensor modules.

According to an embodiment, the movement sensing unit $\mathbf{111}_1$ may sense contact of the user $\mathbf{11}_1$ through a touch sensor included in a portion near the trigger of the weapon, and sense the aiming movement according to a movement with respect to x, y and z axes of the weapon through at least one of the gyro sensor, acceleration sensor, gravity sensor and geomagnetic sensor included in the weapon. In addition, the movement sensing unit $\mathbf{111}_1$ may sense firing of the weapon using a firing sensor.

The operation controller $\mathbf{112}_1$ may perform a control operation to collect, from the environment information collecting module including at least one of a camera, a microphone and a GPS device, environment information within a radial distance from the 111 based on the sensed aiming movement.

According to an embodiment, the environment information collecting module may be installed in the first cop's black-box 110$_1$, or attached to at least one of clothing of the 111, the weapon, a police car and a motorcycle. According to an embodiment, the environment information collecting module may correspond to at least one of a terminal (smartphone) of the user 11$_1$, a Tablet, a camcorder, a recorder and a CCTV which are capable of collecting information about the environment around the user 11$_1$.

According to an embodiment, the first cop's black-box 110$_1$ may further include at least one of a memory disk, built-in battery and microprocessor in addition to the environment information collecting module.

The operation controller 112$_1$ may sense the step of preparation of firing based on contact of the 111 with the weapon, and control operating or stopping the environment information collecting module associated with the user 11$_1$ or the weapon to collect environment information based on the aiming movement to the subject 10.

For example, the operation controller 112$_1$ may sense the step of preparation of firing from contact of the user 11$_1$ with the weapon based on the sensing information sensed through the movement sensing unit 111$_1$, and operate the environment information collecting module through the communication unit 113$_1$ based on the aiming movement to the subject 10 to collect environment information.

According to an embodiment, the operation controller 112$_1$ may sense use of the weapon based on at least one of the duration, intensity and area of contact of the user 11$_1$ with the weapon, and sense the step of preparation of firing based on the sensed use of the weapon. In addition, the operation controller 112$_1$ may recognize the aiming movement to the subject 10 and a phased movement of firing based on the movement of the weapon after the step of preparation of firing.

According to an embodiment, when the operation controller 112$_1$ senses the aiming movement to the subject 10, the operation controller 112$_1$ may perform a control operation to transmit, to the weapon management server 120, an event message containing at least one of an ID corresponding to the weapon possessed by the user 11$_1$, a recorder flag (recorder start/stop flag) of the first cop's black-box, global positioning system (GPS) information (GPS value) and daily information (date) through the communication unit 113$_1$. For example, the event message may be a signal requesting assistance according to use of a weapon sensed by the first cop's black-box 110$_1$.

The daily information may include at least one of the time, day, and date of use of weapon. The ID may be a sign based on a number, character and symbol assigned to the weapon. The recorder flag may have bits predefined to transmit and receive information about use of the weapon. The GPS information may be the current location of the user 11$_1$ in a signal received from a GPS satellite.

According to an embodiment, when the operation controller 112$_1$ senses an aiming movement to the subject 10, the operation controller 112$_1$ may store the information collected from the environment information collecting module or transmit the same to the weapon management server 120 in real time.

According to an embodiment, when the operation controller 112$_1$ senses firing, operation controller 112$_1$ may perform a control operation to transmit emergency situation information to the weapon management server 120 or a plurality of second cop's black-boxes 110$_2$, . . . , 110$_n$ via the communication unit 113$_1$.

The communication unit 113$_1$ may receive sensing information about a contact from a plurality of sensor modules, and transmit environment information collected from the environment information collecting module. For example, the communication unit 113$_1$ may receive and transmit information using Long Range (LoRa), which is a Low Power Wide Area Network (LPWDAN).

A chip set may be provided to a LoRa apparatus or device to transmit and receive a small amount of data at low power, and provide normal mutual operability for the user and developer to meet the requirements for, for example, bidirectional communication for security, mobility and localization service which are required on the Internet.

In addition, the LoRa has advantages of providing a long communication range (up to maximum of 21 km in an environment where a clear view is secured) and ensuring years of service life of the terminal battery according to low power consumption. Further, the LoRa may provide higher cost efficiency and extensibility than the 3G/4G cellular networks.

According to an embodiment, the communication unit 113$_1$ may perform communication between the first cop's black-box 110$_1$ and the environment information collecting module. To perform communication between the first cop's black-box 110$_1$ and the environment information collecting module, at least one of Bluetooth and Wi-Fi, which are internal data communication buses or short-range wireless communication networks, may be employed.

Referring back to FIG. 1, the weapon management server 120 receives external environment information from the second cop's black-boxes 110$_2$, . . . , 110$_n$ located within a preset radial distance from the user 11$_1$ based on an event message received from the first cop's black-box 110$_1$ according to the aiming movement to the subject 10.

To this end, the weapon management server 120 may include a communication controller 121 and a media manager 122.

The communication controller 121 may generate and transmit a control command for collecting external environment information of the second cop's black-boxes 110$_2$, . . . , 110$_n$ located within a preset boundary 12 around the user 11$_1$ from the event message received from the first cop's black-box 110$_1$ based on the aiming movement of the user 11$_1$ to the subject 10.

The communication controller 121 may receive external environment information about the boundary 12 of the user 11 from an environment information collecting module associated with the second cop's black-boxes 110$_2$, . . . , 110$_n$ in response to transmission of the generated control command to the second cop's black-boxes 110$_2$, . . . , 110$_n$. Herein, the external environment information may include information about the boundary 12 of the user 11 which is collected by the first cop's black-box 110$_1$.

For example, based on the event message received from the first cop's black-box 110$_1$ based on the aiming movement of the user 11$_1$ to the subject 10, the communication controller 121 may generate a control command to collect, from environment information collecting modules associated with the second cop's black-boxes 110$_2$, . . . , 110$_n$, external environment information within radial distances from fellow users 11$_2$ . . . 11$_n$ other than the user 11$_1$ who is standing against the subject 10.

According to an embodiment, the communication controller 121 may supplement the environment information which is not collected by the first cop's black-box 110$_1$ and is within the radial distance from the user 11$_1$ who is standing against the subject 10, with the external environment information received from the second cop's black-boxes 110$_2$, . . . , 110$_n$.

In addition, the communication controller 121 may perform a control operation to transmit situation information about use of a weapon to an external data processing server based on at least one of the external environment information, event message and environment information which are managed by and stored in the media manager 122.

More specifically, the communication controller 121 may determine a danger level according to use of a weapon based on the external environment information, event message and environment information received from the cop's black-box 110, and may transmit a signal for requesting assistance to an external server (at, for example, the police station) depending on the determined danger level.

The event message may contain at least one of an ID corresponding to the weapon possessed by the user 11$_1$, a recorder flag (recorder start/stop flag) of the first cop's black-box, GPS information (GPS value) and daily information (date).

The media manager 122 may collect and manage external environment information corresponding to the control command transmitted to the second cop's black-boxes 110$_2$, . . . , 110$_n$.

The media manager 122 may collect, manage and store the external environment information received from the second cop's black-boxes 110$_2$, . . . , 110$_n$ and the event message and environment information received from the first cop's black-box 110$_1$.

Referring to FIG. 1, the weapon management system 100 may further include a data processing server 130.

The data processing server 130 may perform communication with at least one of the cop's black-box 110 and the weapon management server 120, receive at least one of an event message, environment information and external environment information according to an aiming movement of the user 11 to the subject 10 from the cop's black-box 110, and receive information collected and managed by the weapon management server 120.

In addition, the data processing server 130 may monitor use of the weapon by the user 11$_1$ standing against the subject 10 in real time, and take an action to apprehend the subject 10 by deploying most closely located fellow users 11$_2$, . . . , 11$_n$ at a place where firing has occurred, based on the monitoring.

According to an embodiment, the data processing server 130 may recognize the location where the weapon of the user 11 is used and corresponding daily information (time and date), and then determine whether use of the weapon by the user 11 is legal by comparing the recognized information with conditions for permission of use of the weapon of the user 11.

More specifically, for example, if the user 11 using the weapon is a typical person other than a police officer to apprehend the subject 10, and it is determined, based on the typical conditions for permission of hunting, that the user has illegally used the weapon in violation of the conditions for permission of use of the weapon, a command to report the location of the user 11 in real time may be transmitted to the weapon management server 120.

As another example, if the user 11 is a police officer to apprehend the subject 10, it may be determined whether the weapon has been legally used. Determination of legality of use of the weapon may be performed based on at least one of movement of the user 11, duration of contact with the weapon, collected environment information and external environment information, law information and movement of the subject 10.

According to some embodiments, the data processing server 130 may be a server of at least one of a police station, public institution and Public Prosecutor's Office.

Referring to FIG. 1, the cop's black-box 110 senses an aiming movement of the user to the subject from a plurality of sensor modules included in a weapon, performs a control operation to collect environment information based on the sensed aiming movement, and transmits the received environment information.

To this end, the cop's black-box 110 includes a movement sensing unit 111, an operation controller 112 and a communication unit 113.

The movement sensing unit 111 senses an aiming movement of the user to a subject based on the sensing information received from a plurality of sensor modules included in the weapon.

The operation controller 112 performs a control operation based on the sensed aiming movement to collect, from an environment information collecting module including at least one of a camera, a microphone and a GPS device, environment information within a radial distance from the user.

The operation controller 112 may perform a control operation to collect environment information by controlling operating and stopping of the environment information collecting module in response to the aiming movement of the user to the subject or a control command received from the weapon management server 120.

In addition, the operation controller 112 may perform a control operation to transmit situation information about use of a weapon to the weapon management server 120 through the communication unit 113. The situation information is based on at least one of an event message and environment information. The event message contains at least one of an ID corresponding to the weapon possessed by the user, a recorder flag (recorder start/stop flag), GPS information (GPS value) and daily information (date), which are generated based on the aiming movement.

The communication unit 113 receives sensing information about a contact from a plurality of sensor modules, and transmits environment information collected from the environment information collecting module.

Since details of the cop's black-box 110 have been described above, description of the cop's black-box 110 will be omitted from the following description.

Figure 2A:
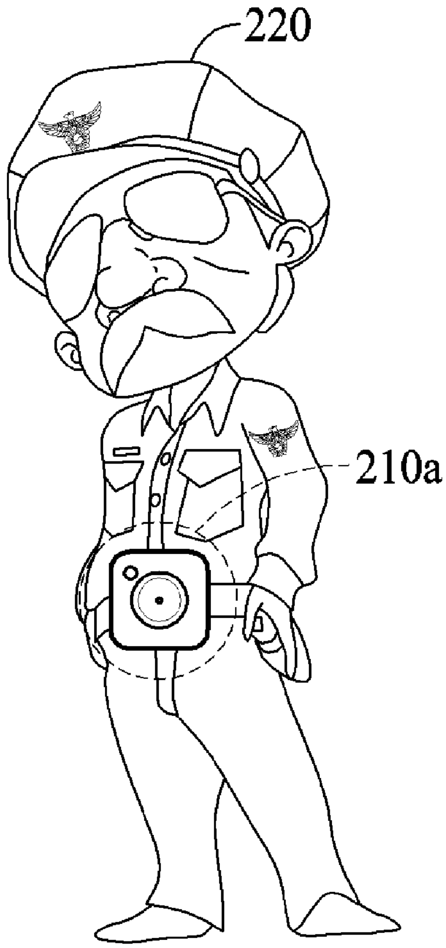
FIGS. 2A to 2C illustrate exemplary applications of cop's black-boxes.
Figure 2B:
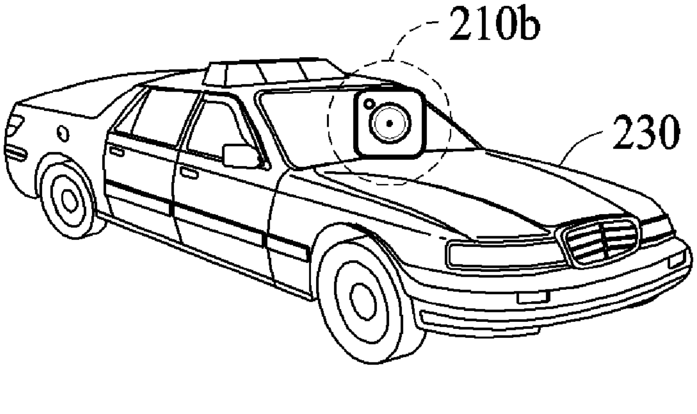
Figure 2C:
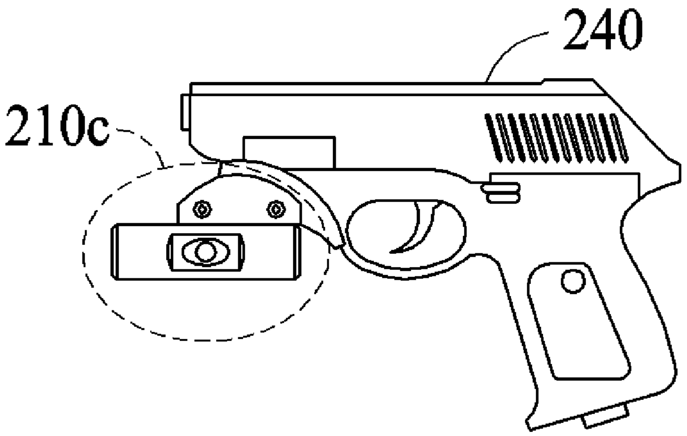

FIGS. 2A to 2C illustrate exemplary applications of cop's black-boxes.

More specifically, FIG. 2C illustrates a cop's black-box 210*a* attached to the clothing of a user 220, FIG. 2B illustrates a cop's black-box 210*b* included in a police car 230, and FIG. 2C illustrates a cop's black-box 210*c* attached to a weapon 240.

Referring to FIG. 2A, the cop's black-box 210*a* may be attached to the clothing of the user 220. According to an embodiment, the cop's black-box 210*a* may be attached to at least one of the cap, clothing, belt, saddle, glasses and holster of the user 220.

Referring to FIG. 2B, the cop's black-box 210*b* may be included in the police car 230. According to an embodiment, the cop's black-box 210*b* may be included a typical automobile black-box. The cop's black-box 210*b* may be included in all vehicles including the police car 230 and a motorcycle which are used by the user 220.

Referring to FIG. 2C, the cop's black-box 210*c* may be included in the weapon 240. The cop's black-box 210*c* may be attached to any positions at which the cop's black-box 210*c* does not interfere with use of the weapon 240.

Figure 3:
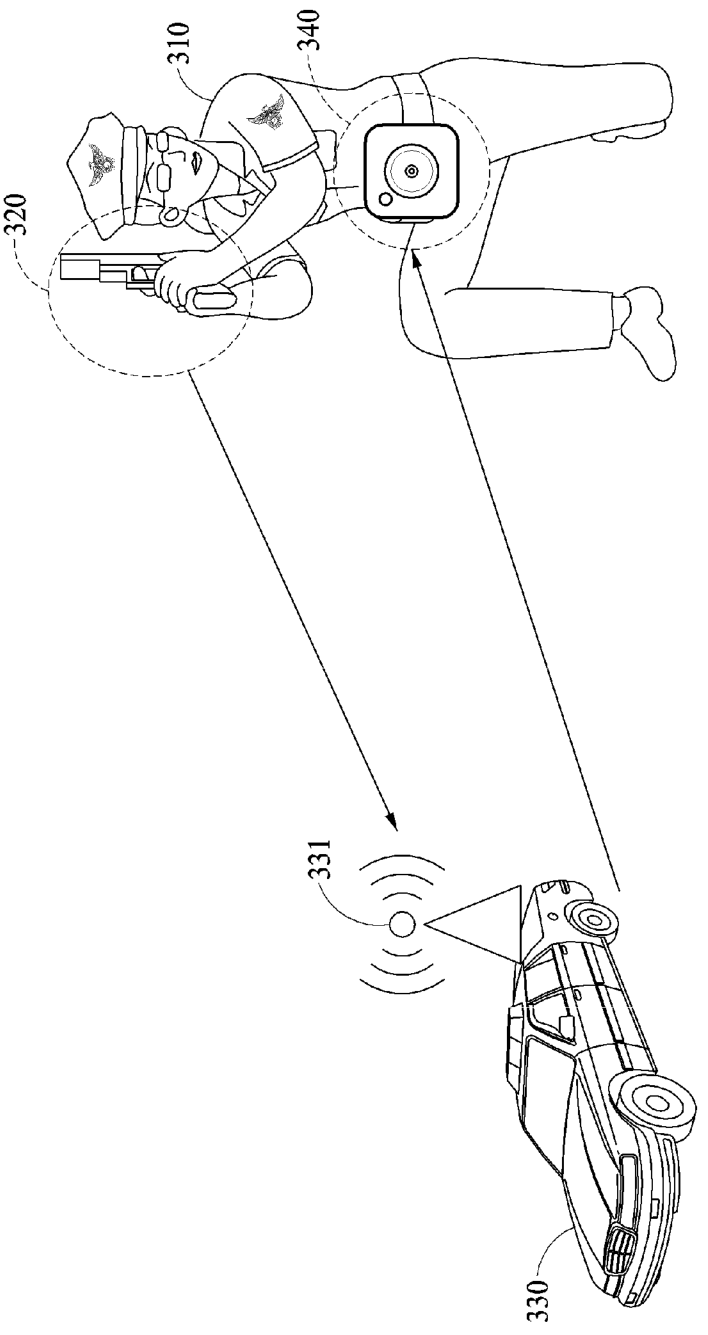
FIG. 3 illustrates an operation of sensing use of a weapon using a cop's black-box according to another embodiment of the present invention.

FIG. 3 illustrates an operation of sensing use of a weapon using a cop's black-box according to another embodiment of the present invention.

More specifically, FIG. 3 illustrates an operation of sensing use of a weapon using a cop's black-box 340 attached to the belt of the user 310.

Referring to FIG. 3, the cop's black-box 340 may sense an aiming movement of the user 310 through a communication unit 331 of a police car 330. The aiming movement may be determined based on sensing information received from a plurality of sensor modules included in a weapon 320.

The sensing information generated by the weapon 320 may be transmitted to the police car 330, and then be transmitted to the cop's black-box 340 through the communication unit 331 of the police car. According to an embodiment, the sensing information generated by the weapon 320 may be directly transmitted to the cop's black-box 340.

A cop's black-box (or weapon management server) (not shown) included in the police car 330 according to another embodiment of the present invention may transmit a request for collection of external environment information about use of the weapon to a plurality of second cop's black-boxes (not shown) connected with fellow users, based on the sensing information received by the communication unit 331 of the police car 330.

According to another embodiment, the cop's black-box 340 may sense movement of the user 310 through the sensor modules included in the weapon 320. Referring to FIG. 3, when the user 310 holds the weapon 320 with the flash suppressor (gunpoint) pointed upward rather than at the subject, the cop's black-box 340 may sense this pose of the user 310 as an aiming movement, and thus perform a control operation to collect environment information from the environment information collecting module.

According to an embodiment, the aiming movement may be pointing the flash suppressor of the weapon 320 upward or at the subject as shown in FIG. 3, and may be based on a movement according to a grip on the weapon 320 of the user 310.

Figure 4:
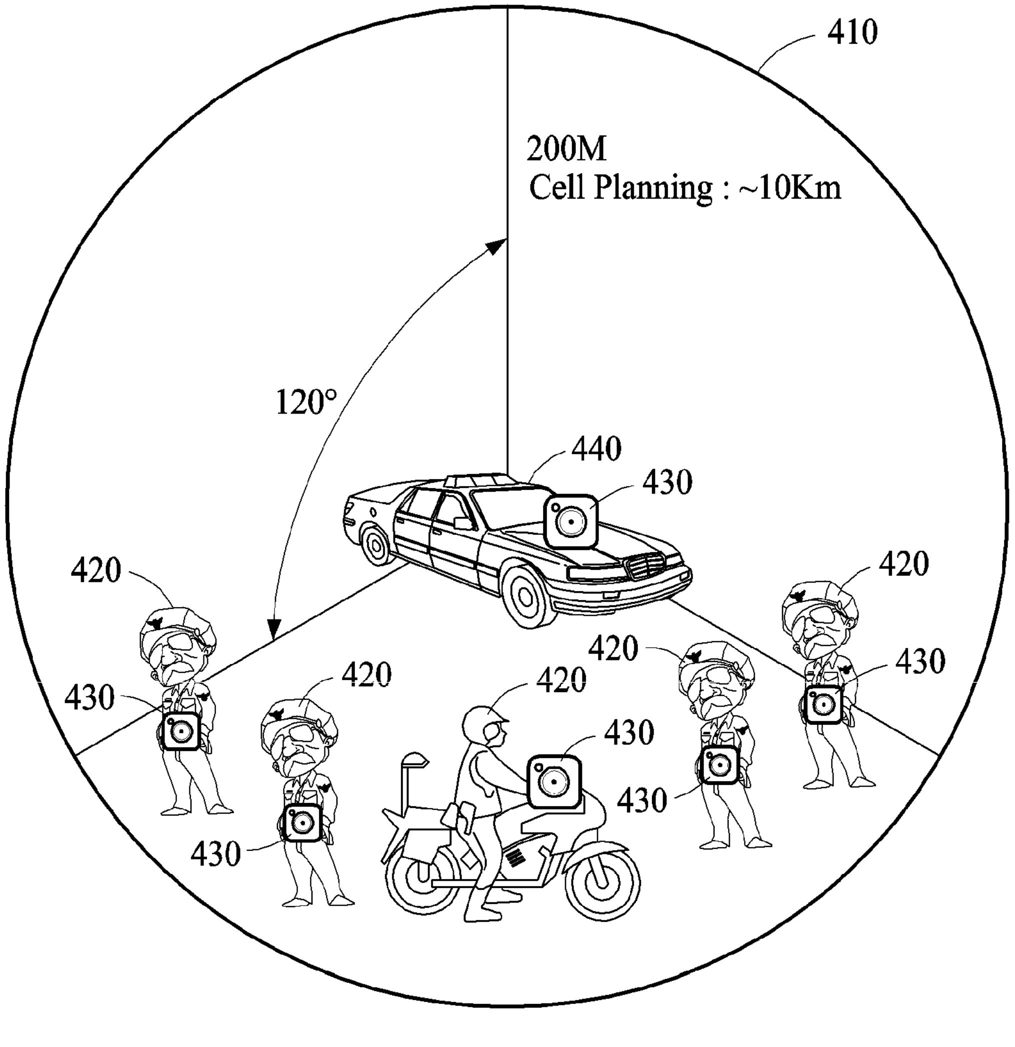
FIG. 4 illustrates operation of a plurality of second cop's black-boxes located within a preset boundary around a first cop's black-box according to another embodiment of the present invention.

FIG. 4 illustrates operation of a plurality of second cop's black-boxes located within a preset boundary around a first cop's black-box according to another embodiment of the present invention.

Referring to FIG. 4, a first cop's black-box 400 may be operated by sensing an aiming movement of a user (not shown) to a subject according to sensing information received from a weapon (not shown) connected with the first cop's black-box 400. A plurality of second cop's black-box 430 located within a preset boundary 410 around the first cop's black-box 400 may be turned on based on operation of the first cop's black-box 400.

For example, a plurality of second cop's black-box 430 associated with users 420 located within the preset boundary 410 may be turned on by the operation of the first cop's black-box 400 included in a police car 440. Thereby, the second cop's black-box 430 may collect external environment information from environment information collecting modules associated therewith.

The preset boundary 410 may be a boundary located at a radial distance of about 200 m from the location of the first cop's black-box 400. According to an embodiment, the boundary 410 may be divided into a plurality of regions, each of which spans through 120°, and only the second cop's black-box 430 located in the respective regions may be turned on.

According to an embodiment, the first cop's black-box 400 may perform communication within the boundary 410 for which cell planning is about 10 km with respect to the first cop's black-box 400.

Figure 5:
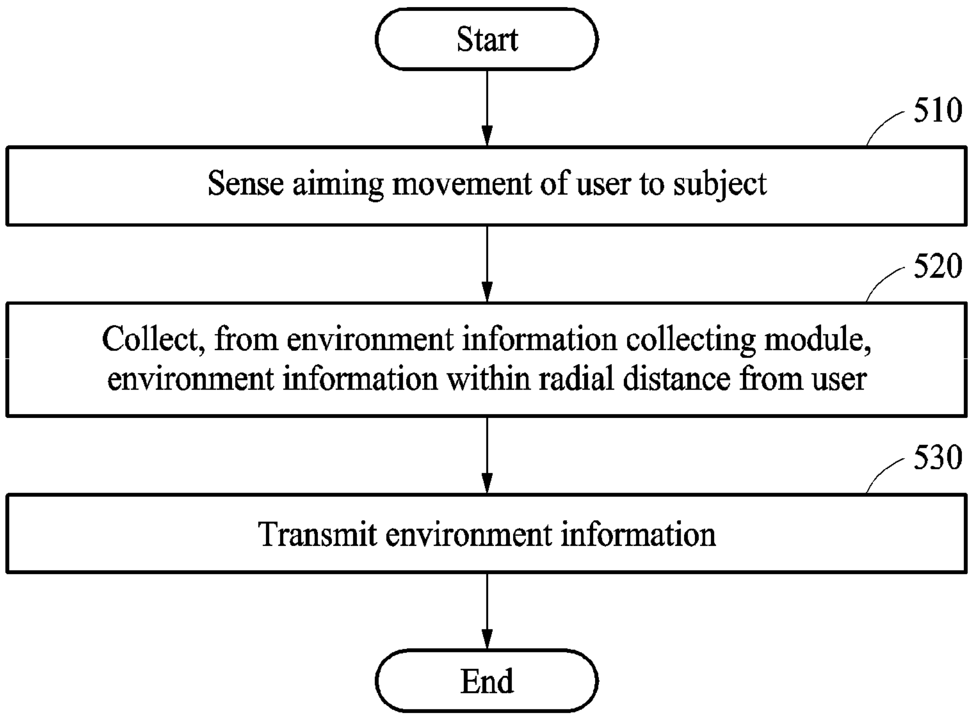
FIG. 5 is a flowchart illustrating operation of a cop's black-box according to an embodiment of the present invention.

FIG. 5 is a flowchart illustrating operation of a cop's black-box according to an embodiment of the present invention.

Referring to FIG. 5, in step 510, an aiming movement of a user to a subject is sensed based on sensing information received from a plurality of sensor modules included in a weapon.

Step 510 may include sensing contact of the user with the weapon, the aiming movement of the user to the subject, and a phased movement of firing based on the sensing information received from the sensor modules included in the weapon.

For example, in step 510, a phased movement of the user to the subject may be sensed based on the sensing information received from the sensor modules including at least one of a gyro sensor, an acceleration sensor, a gravity sensor, a geomagnetic sensor and a touch sensor which are included in the weapon.

In step 520, environment information within a radial distance from the user is collected from an environment information collecting module including at least one of a camera, a microphone, and a GPS device, based on the sensed aiming movement.

Step 520 may include collecting the environment information from the environment information collecting module in response to the phased movement or a control command received from a weapon management server.

The environment information collecting module may be installed in a cop's black-box, and be attached to at least one of the clothing of the user, the weapon, a police car and a motorcycle. In addition, according to an embodiment, the environment information collecting module may correspond to at least one of a terminal (smartphone) of the user, a Tablet, a camcorder, a recorder and a CCTV which are capable of collecting information about the environment around the user.

According to an embodiment, the cop's black-box may further include at least one of a memory disk, built-in battery and microprocessor in addition to the environment information collecting module.

In step 530, the environment information collected from the environment information collecting module is transmitted to an external device.

Step 530 may include transmitting, to the weapon management server, situation information about use of the weapon based on at least one of an event message containing at least one of an ID corresponding to the weapon possessed by the user, a recorder flag (recorder start/stop flag), GPS information (GPS value) and daily information (date), which are generated based on the aiming movement, and the environment information.

The methods described above may be implemented in the form of problem commands executable through various computer means and written in a computer readable medium. The computer readable medium may include program commenced, data files, data files, or a combination thereof. The program commands written in the computer readable medium may be specifically designed or configured for the embodiments or may be well known to those skilled in the art of computer software. Examples of the computer readable recording medium include magnetic media such as a hard disk, a floppy disk and a magnetic tape, optical media such as CD-ROM and DVD, magneto-optical media such as a floptical disk, and hardware device such as ROM, RAM and flash memory which are specifically designed to store and execute program commands. Examples of program commands include mechanical language codes created by a compiler and advanced language codes executable on a computer using, for example, an interpreter. The hardware devices may be configured to operate as one or more software modules to perform operations in the embodiments, and vice versa.

Although exemplary embodiments of the present invention have been disclosed for illustrative purposes, those skilled in the art will appreciate that various modifications, additions and substitutions are possible, without departing from the scope and spirit of the invention as disclosed in the accompanying claims. For example, proper result may be achieved even if the techniques described above are implemented in an order different from that for the disclosed method, and/or disclosed constituents such as a system, structure, device and circuit are coupled to or combined with each other in a form different from that for the disclosed method or replaced by other constituents or equivalents.

Therefore, it is intended that the present invention covers the modifications and variations of the present invention provided they come within the scope of the appended claims and their equivalents.

What is claimed is:

1. A weapon management system using a police officer black-box, the weapon management system comprising:

a first police officer black-box configured to sense an aiming movement of a user to a subject based on sensing information received from a plurality of sensor modules included in a weapon of the user and to collect, based on the sensed aiming movement, environment information from an environment information collecting module associated with the user; and a weapon management server configured to receive external environment information from a plurality of second police officer black-boxes located within a preset boundary around the user, based on an event message received from the first police officer black-box according to the aiming movement to the subject.

2. The weapon management system according to claim 1, wherein the first police officer black-box comprises:

a movement sensing unit configured to sense the aiming movement of the user to the subject based on the sensing information received from the sensor modules included in the weapon;

an operation controller configured to perform a control operation to collect, from the environment information collecting module, the environment information within a radial distance from the user based on the sensed aiming movement, the environment information collecting module comprising at least one of a camera, a microphone and a global positioning system (GPS) device; and a communication unit configured to receive the sensing information about a contact from the plurality of sensor modules and to transmit the environment information collected from the environment information collecting module.

3. The weapon management system according to claim 2, wherein the movement sensing unit senses the aiming movement of the user to the subject based on the sensing information received from the plurality of sensor modules, the plurality of sensor modules comprising at least one of a gyro sensor, an acceleration sensor, a gravity sensor, a geomagnetic sensor and a touch sensor.

4. The weapon management system according to claim 3, wherein the movement sensing unit senses contact of the user with the weapon, the aiming movement to the subject, and a phased movement of firing based on the sensing information received from the plurality of sensor modules.

5. The weapon management system according to claim 4, wherein the operation controller senses preparation of firing based on the contact of the user with the weapon, and controls triggering and stopping of an operation to collect the environment information in the environment information collecting module associated with the user or the weapon according to the aiming movement to the subject.

6. The weapon management system according to claim 1, wherein the weapon management server comprises:

a communication controller configured to generate and transmit a control command to collect, from the event message received from the first police officer black-box based on the aiming movement of the user to the subject, the external environment information of the plurality of second police officer black-boxes located within the preset boundary around the user; and a media manager configured to collect and manage the external environment information corresponding to the control command transmitted to the second police officer black-boxes.

7. The weapon management system according to claim 6, wherein the communication controller receives the external environment information about the boundary of the user from an environment information collecting module associated with the plurality of second police officer black-boxes according to the control command generated and transmitted to the plurality of second police officer black-boxes, wherein the external environment information comprises information about the boundary of the user which is not collected by the first police officer black-box.

8. The weapon management system according to claim 7, wherein the media manager collects, manages and stores the external environment information received from the plurality of second police officer black-boxes and the event message and environment information received from the first police officer black-box.

9. The weapon management system according to claim 8, wherein the communication controller performs a control operation to transmit, to an external data processing server, situation information about use of the weapon based on at least one of the external environment information, event message and environment information managed by and stored in the media manager.

10. The weapon management system according to claim 6, wherein the event message comprises at least one of an ID corresponding to the weapon possessed by the user, a recorder flag (recorder start/stop flag) of the first police officer black-box, GPS information (a GPS value) and daily information (a date).

11. A police officer black-box comprising:

a movement sensing unit configured to sense an aiming movement of a user to a subject based on sensing information received from a plurality of sensor modules included in a weapon of the user;

an operation controller configured to perform a control operation to collect, from an environment information collecting module, environment information within a radial distance from the user based on the sensed aiming movement, the environment information collecting module comprising at least one of a camera, a microphone and a global positioning system (GPS) device; and a communication unit configured to receive the sensing information about a contact from the plurality of sensor modules and to transmit the environment information collected from the environment information collecting module.

12. The police officer black-box according to claim 11, wherein the operation controller performs a control operation to collect the environment information by controlling triggering and stopping of operation of the environment information collecting module according to the aiming movement of the user to the subject or a control command received from a weapon management server.

13. The police officer black-box according to claim 12, wherein the operation controller performs a control operation to transmit situation information about use of the weapon to the weapon management server through the communication unit, the situation information being based on at least one of an event message generated based on the aiming movement and containing at least one of an ID corresponding to the weapon possessed by the user, a recorder flag (recorder start/stop flag), GPS information (a GPS value) and daily information (a date) and the environment information.

14. A method for operating a police officer black-box, comprising:

sensing an aiming movement of a user to a subject based on sensing information received from a plurality of sensor modules included in a weapon of the user;

collecting, from an environment information collecting module, environment information within a radial distance from the user based on the sensed aiming movement, the environment information collecting module comprising at least one of a camera, a microphone and a global positioning system (GPS) device; and transmitting the environment information collected from the environment information collecting module.

15. The method according to claim 14, wherein the sensing of the aiming movement comprises:

sensing contact of the user with the weapon, the aiming movement to the subject, and a phased movement of firing based on the sensing information received from the plurality of sensor modules.

16. The method according to claim 15, wherein the collecting of the environment information comprises:

collecting the environment information from the environment information collecting module according to the phased movement or a control command received from a weapon management server.

17. The method according to claim 16, wherein the transmitting of the environment information comprises:

transmitting situation information about use of the weapon to the weapon management server, the situation information being based on at least one of an event message generated based on the aiming movement and containing at least one of an ID corresponding to the weapon possessed by the user, a recorder flag (recorder start/stop flag), GPS information (a GPS value) and daily information (a date) and the environment information.

18. A non-transitory computer readable recording medium storing a program for executing a method for operating a police officer black-box using a computer, the method comprising:

sensing an aiming movement of a user to a subject based on sensing information received from a plurality of sensor modules included in a weapon of the user;

collecting, from an environment information collecting module, environment information within a radial distance from the user based on the sensed aiming movement, the environment information collecting module comprising at least one of a camera, a microphone and a global positioning system (GPS) device; and transmitting the environment information collected from the environment information collecting module.

19. A non-transitory computer readable recording medium storing a program for executing a method for operating a police officer black-box using a computer, the method comprising;

sensing an aiming movement of a user to a subject based on sensing information received from a plurality of sensor modules included in a weapon of the user;

collecting, from an environment information collecting module, environment information within a radial distance from the user based on the sensed aiming movement, the environment information collecting module comprising at least one of a camera, a microphone and a global positioning system (GPS) device; and transmitting the environment information collected from the environment information collecting module, wherein the sensing of the aiming movement comprising:

sensing contact of the user with weapon, the aiming movement to the subject, and a phased movement of firing based on the sensing information received from the plurality of sensor modules.

20. A non-transitory computer readable recording medium storing a program for executing a method for operating a police officer black-box using a computer, the method comprising:

sensing an aiming movement of a user to a subject based on sensing information received from a plurality of sensor modules included in a weapon of the user;

collecting, from an environment information collecting module, environment information within a radial distance from the user based on the sensed aiming movement, the environment information collecting module comprising at least one of a camera, a microphone and a global positioning system (GPS) device; and transmitting the environment information collected from the environment information collecting module, wherein the sensing of the aiming movement comprising:

sensing contact of the user with the weapon, the aiming movement to the subject, and a phased movement of firing based on the sensing information received from the plurality of sensor modules, and wherein the collecting of the environment information comprising:

collecting the environment information from the environment information collecting module according to the phased movement or a control command received from a weapon management server.

* * * * *